United States Patent
Ehrsam et al.

(10) Patent No.: US 9,140,192 B2
(45) Date of Patent: Sep. 22, 2015

(54) STARTUP METHOD FOR LARGE STEAM TURBINES

(75) Inventors: Andreas Ehrsam, Rieden (CH);
Thomas Schreier, Neuenhof (CH);
Martin Schoenenberger, Zurich (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 814 days.

(21) Appl. No.: 13/347,745

(22) Filed: Jan. 11, 2012

(65) Prior Publication Data
US 2013/0177388 A1 Jul. 11, 2013

(51) Int. Cl.
*F01D 19/00* (2006.01)
*F02C 7/26* (2006.01)
*F01K 13/02* (2006.01)

(52) U.S. Cl.
CPC . *F02C 7/26* (2013.01); *F01D 19/00* (2013.01); *F01K 13/02* (2013.01)

(58) Field of Classification Search
USPC .............. 60/646, 786, 657; 415/1, 15, 17, 19; 416/35
See application file for complete search history.

(56) References Cited

U.S. PATENT DOCUMENTS

| | | | |
|---|---|---|---|
| 3,959,635 A | 5/1976 | Tanco | |
| 5,042,246 A * | 8/1991 | Moore et al. | 60/773 |
| 7,421,854 B2 * | 9/2008 | Shaffer et al. | 62/500 |
| 7,506,517 B2 | 3/2009 | Uluyol et al. | |
| 7,980,053 B2 | 7/2011 | Yakushi et al. | |
| 8,195,339 B2 * | 6/2012 | Long et al. | 700/291 |
| 2009/0158738 A1 * | 6/2009 | Hu et al. | 60/646 |

FOREIGN PATENT DOCUMENTS

| | | |
|---|---|---|
| DE | 10116387 | 10/2002 |
| WO | 2006037417 A1 | 4/2006 |

OTHER PUBLICATIONS

"Thermal Stress Control Characteristics of Siemens 350 MW Steam Turbine In Its Rapid Startup", 2011.*

(Continued)

*Primary Examiner* — Dwayne J White
*Assistant Examiner* — Justin Seabe
(74) *Attorney, Agent, or Firm* — Buchanan Ingersoll & Rooney PC

(57) ABSTRACT

A method of controlling a steam turbine, having a controller controlling at least the position of a steam inlet valve located in a steam conduit between a steam generator and the turbine to control mass flow into the turbine, includes selecting, before beginning startup, a predefined set of startup sequences of setpoints based on a turbine status at the beginning of startup and/or a startup mode chosen by the operator, the set of startup sequences of setpoints includes parameters controlled and not controlled by the controller; using the controller to control the parameters controlled by the controller so as to progress the turbine from setpoint to setpoint in accordance with predefined set of startup sequences until reaching a release point; and at the release point, delaying moving to the next setpoint until actual setpoint values agree with predefined release point setpoint values for parameters not controlled by the controller.

9 Claims, 4 Drawing Sheets

(56) References Cited

OTHER PUBLICATIONS

Hu, et al. "Thermal stress control characteristics of Siemens 350 MW steam turbine in its rapid startup", Baosteel Technology, No. 1, 2011, pp. 44-48, Feb. 2011, and a Partial English Translation (6 pages).

First Office Action issued on Aug. 4, 2014, by the State Intellectual Property Office of the People's Republic of China in Chinese Patent Application No. 201310010150.6, and an English translation of the Office Action. (20 pages).

* cited by examiner

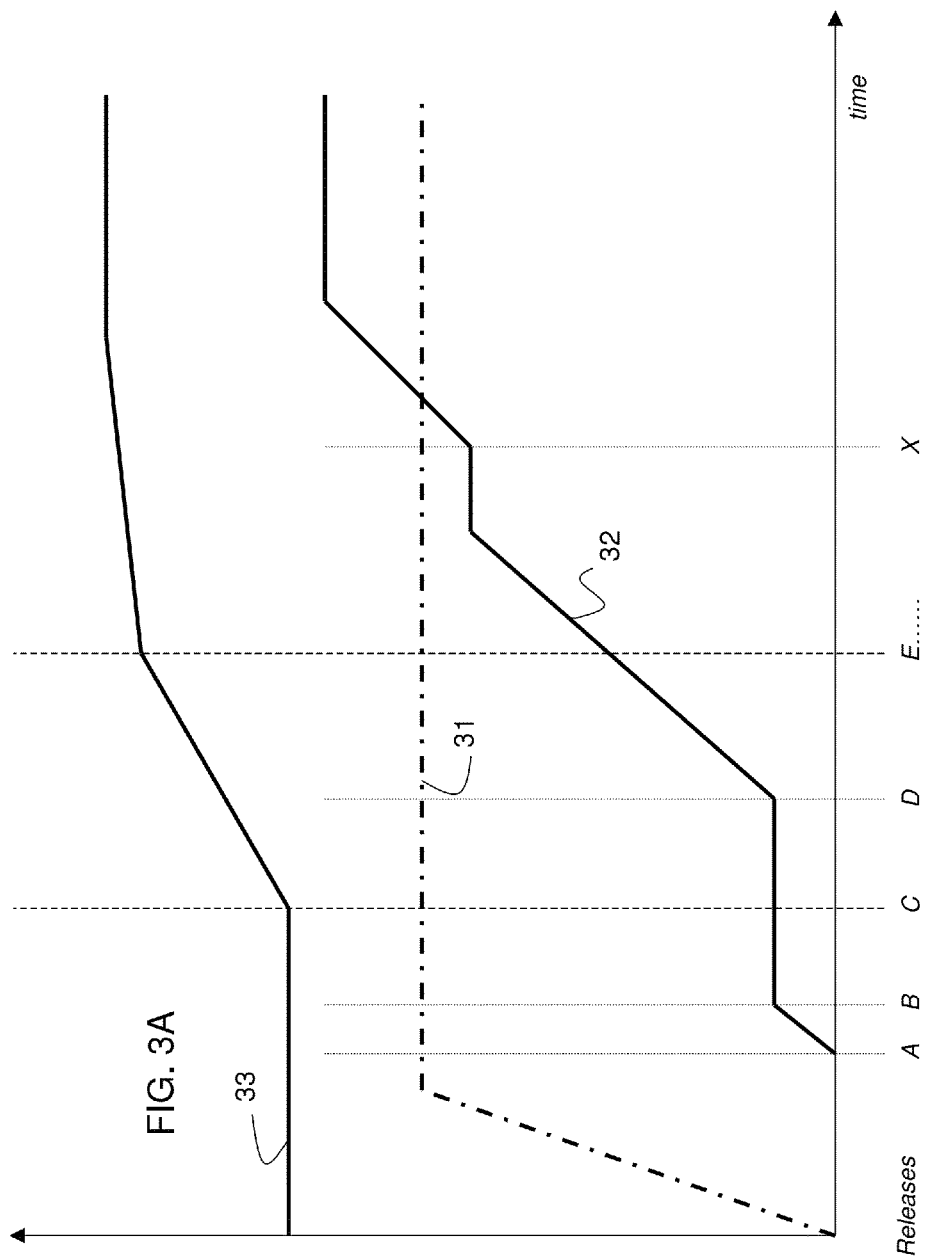

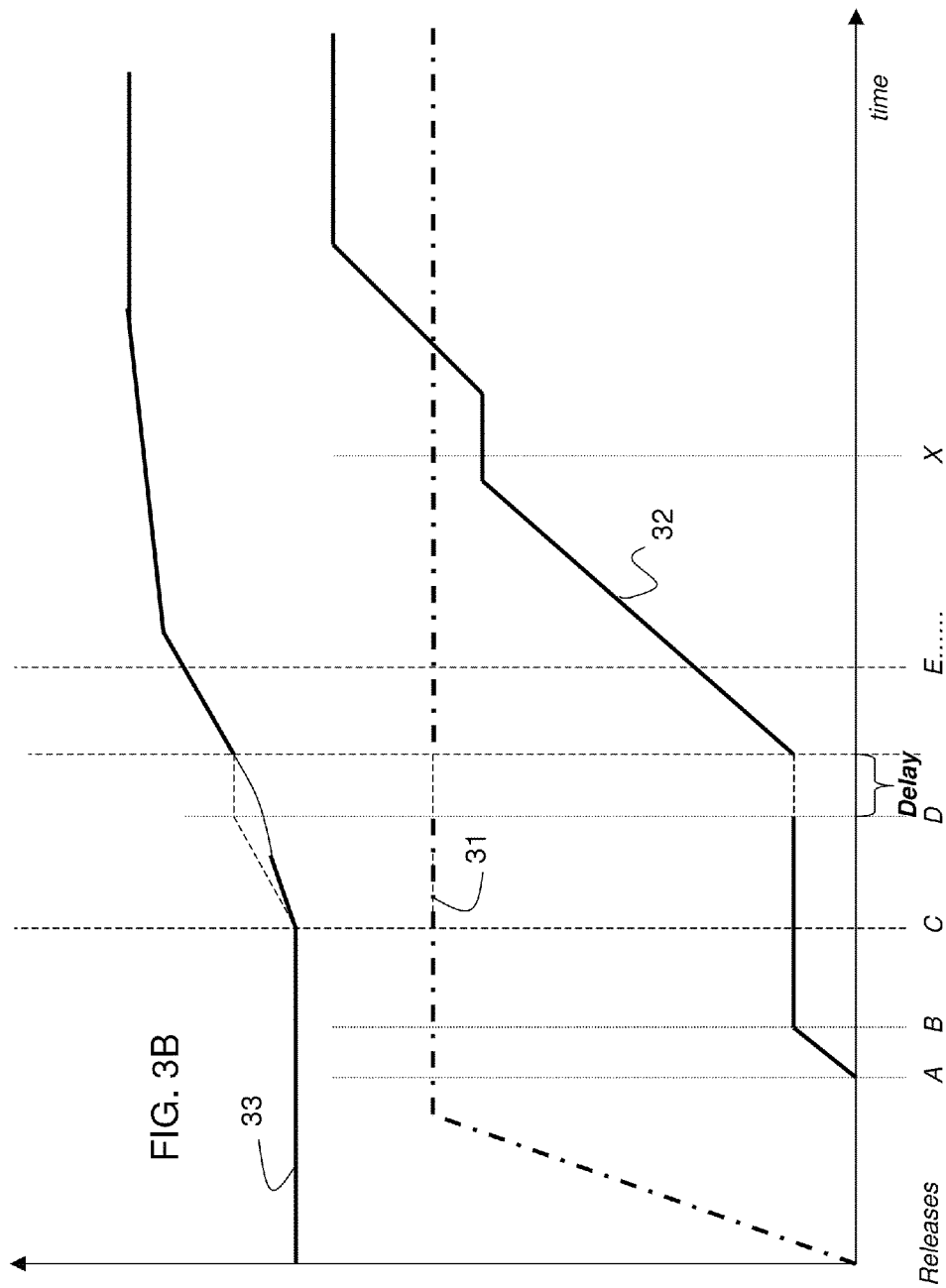

STARTUP METHOD FOR LARGE STEAM TURBINES

FIELD OF INVENTION

The present invention relates to methods of starting a large turbine, more specifically a large steam turbine such as being coupled to generators for electrical power generation and receiving large amount of steam from an external steam source, particularly where such steam source is outside the direct control of the turbine controlling system.

BACKGROUND

In the following description the term "turbine" is used to refer to rotary engines having a rotating part and a stator part force coupled by a fluid medium such as water, steam or gas. Of particular interest for the present invention are axial steam turbines comprising radially arranged fixed stator blades or vanes alternating with radially arrangements of moving rotor blades force-coupled by a flow of steam through the turbine.

In large turbines, particularly steam turbines, the starting procedure is considered a very critical operation. A steam turbine can be considered to be large steam turbine for electrical power outputs at full load of 300 MW or more. Typically such turbines include large metal parts such as casings and rotors. As a consequence care has to be taken during the startup of a turbine to not induce for example critical thermal stresses due to the temperature difference between steam fed into the turbine and the large metal parts. Limits on the thermal stresses and other mechanical parameters make the rapid startup of a power plant with a steam turbine section a difficult process.

However there is seen an increasing demand to accelerate the startup time for steam turbines as steam power or combined cycle power plants have to react rapidly to fluctuation in the electrical power supply and demand. Particularly the increase in renewable energy plants such as wind, wave and solar power plants with their fluctuating outputs led to a higher demand for flexibility of the conventional power plants.

It is therefore not surprising that a large body of literature exists contemplating various methods of improving the startup process. Published documents providing a background to the challenges of the startup procedure include for example U.S. Pat. Nos. 3,959,635, 7,506,517, 7,980,053, International Patent Application publication WO 2006/037417, as well as German patent application DE 10116387 (A1), which is owned by the same Assignee as the present application.

In most cases the proposed solution includes a simple or complex feedback control based on measured parameters and a setting of control values based either directly on the measured values or indirectly using models and predictions avoiding the thresholds as defined by the critical stress limits and other parameters. In view of this prior art, it is seen as an object to provide a stable and robust method of controlling the startup of a steam turbine.

SUMMARY

The present disclosure is directed to a method of controlling a startup of a steam turbine receiving steam from a steam generator and having a rotor linked to a power generator and a steam turbine controller controlling at least the position of a steam inlet valve located in a steam conduit between the steam generator and the steam turbine to control the mass flow into the steam turbine. The method includes selecting, before beginning of the startup, a predefined set of startup sequences of setpoints based on a status of the steam turbine at the beginning of the startup and/or a startup mode chosen by the operator wherein the set of startup sequences of setpoints includes parameters not controlled by the steam turbine controller and parameters controlled by the steam turbine controller. The method also includes using the steam turbine controller to control the parameters controlled by the steam turbine controller so as to progress the steam turbine from setpoint to setpoint in accordance with the predefined set of startup sequences until reaching a release point; and delaying, at the release point, moving to the next setpoint until actual/measured setpoint values agree with predefined setpoint values at the release point for the parameters not controlled by the steam turbine controller.

BRIEF DESCRIPTION OF THE DRAWINGS

Exemplary embodiments of the invention will now be described, with reference to the accompanying drawings, in which:

FIG. 3A is a simplified plot of startup sequence parameters in accordance with an example of the invention; and FIG. 3B shows the startup sequence parameter of FIG. 3A with a delay at a release point.

DETAILED DESCRIPTION OF THE PREFERRED EMBODIMENTS

Introduction to the Embodiments

Figure 1:
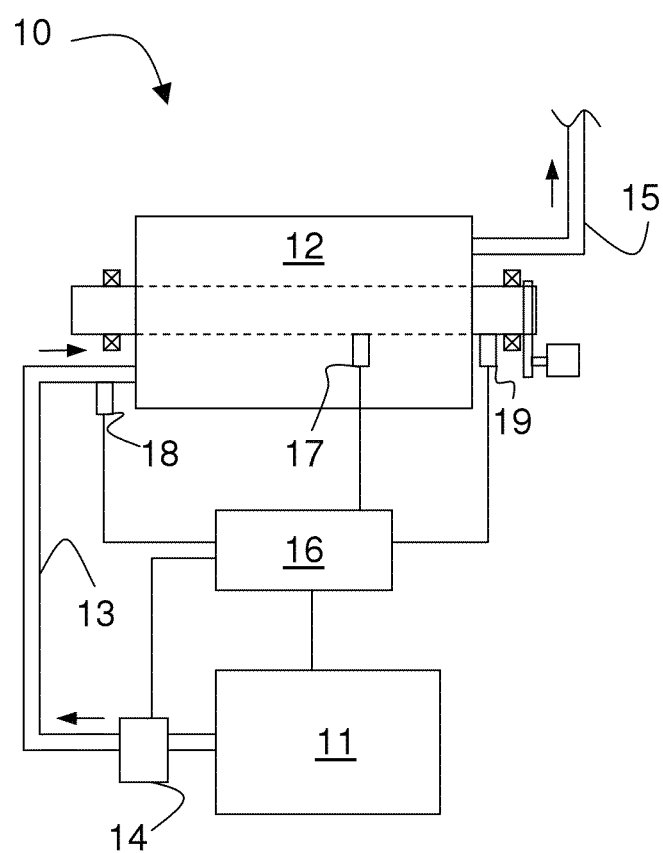
FIG. 1 is a schematic diagram of elements involved in the startup process of a steam turbine.

According to an aspect of the present invention, there is provided a method of controlling a steam turbine receiving steam from a steam generator and having a rotor linked to a power generator and a steam turbine controller controlling at least the position of a steam inlet valve located in a steam conduit between the steam generator and the steam turbine to control the mass flow into the steam turbine, the method including the steps of before beginning of the startup selecting a predefined set of startup sequences of setpoints based on a status of the steam turbine at the beginning of the startup and/or a startup mode chosen by the operator wherein the set of startup sequences of setpoints includes parameters not directly controlled by the steam turbine controller and parameters directly controlled by the steam turbine controller; using the steam turbine controller to control the parameters controlled by the steam turbine controller so as to progress the steam turbine from setpoint to setpoint in accordance with the predefined set of startup sequences until reaching a release point; and at the release point delaying the move to the next setpoint until actual setpoint values agree with the predefined setpoint values at the release point for the parameters not directly controlled by the steam turbine controller.

Among the parameters which can be typically controlled by the steam turbine controller are the speed of the turbine rotor and/or load on the turbine. Among the parameters which are typically not directly controlled by the steam turbine controller are steam temperature and/or steam pressure. The latter parameters are typically controlled by a controller different from the steam turbine controller, i.e., a boiler controller, which can control the operation of the steam generator differently from the values as demanded or requested by the steam turbine controller.

In many power plant operations, it is not possible to let the steam turbine controller take direct control of the steam generator. A direct control in this description is meant to be a system where the controller controls the state of apparatus such as valves and switches which in turn cause a direct change of the parameter as defined by the setpoint. A classical example of such a direct control the closed or feedback loop control.

The method can also include the output of a startup time associated with the selected sequence, as the start process in accordance with the present invention can be regarded as being essentially deterministic in the absence of an overriding condition.

Another preferred feature is to change the processing of the output of a thermal stress monitor at the event of the selected sequence not generating the expected setpoint values. For example the stress monitor can be left inactive or its output ignored during the start-up phase.

These and further aspects of the invention will be apparent from the following detailed description and drawings as listed below.

DETAILED DESCRIPTION

In the following there is described an exemplary implementation of the present invention. Given the complexity of modern power plants, the description is necessarily schematic and more focused on certain aspects regarded as helpful in understanding the invention and more general on others.

As shown in FIG. 1, a steam turbine power plant 10 includes at least one steam generator 11, which in the example of a combined cycle power plant can be a heat recovery steam generator (HRSG) or in the case of a steam power plant can be boiler. It further includes at least one steam turbine 12 turbine or a set of steam turbines, for example a high pressure turbine, a medium pressure turbine and a low pressure turbines in a sequential arrangement. A conduit 13 connects the steam generator 11 with the inlet to the steam turbine 12. The conduit 13 includes a main inlet valve or valve system 14. An outlet conduit 15 connects the outlet of the steam turbine with either further turbine or with steam recovery or recycling stages (not shown).

Further shown in FIG. 1 is a control system 16, which receives sensor inputs or processed parameters based on sensor inputs and which can issue control signals to main input valve 14 to determine its position and hence the mass flow of steam into the turbine 12. The control system 16 has further direct or indirect links to sensors 17 used to determine the parameters related to rotor speed, to sensors 18 used to determine the parameters related to steam temperature, and to sensors or stress controller 19 used to determine the parameters related to thermal or mechanical stresses in parts of the turbine, particularly the rotor. The latter sensor can include a temperature sensor providing input to a model for calculating or predicting stresses using methods known per se.

Figure 2:
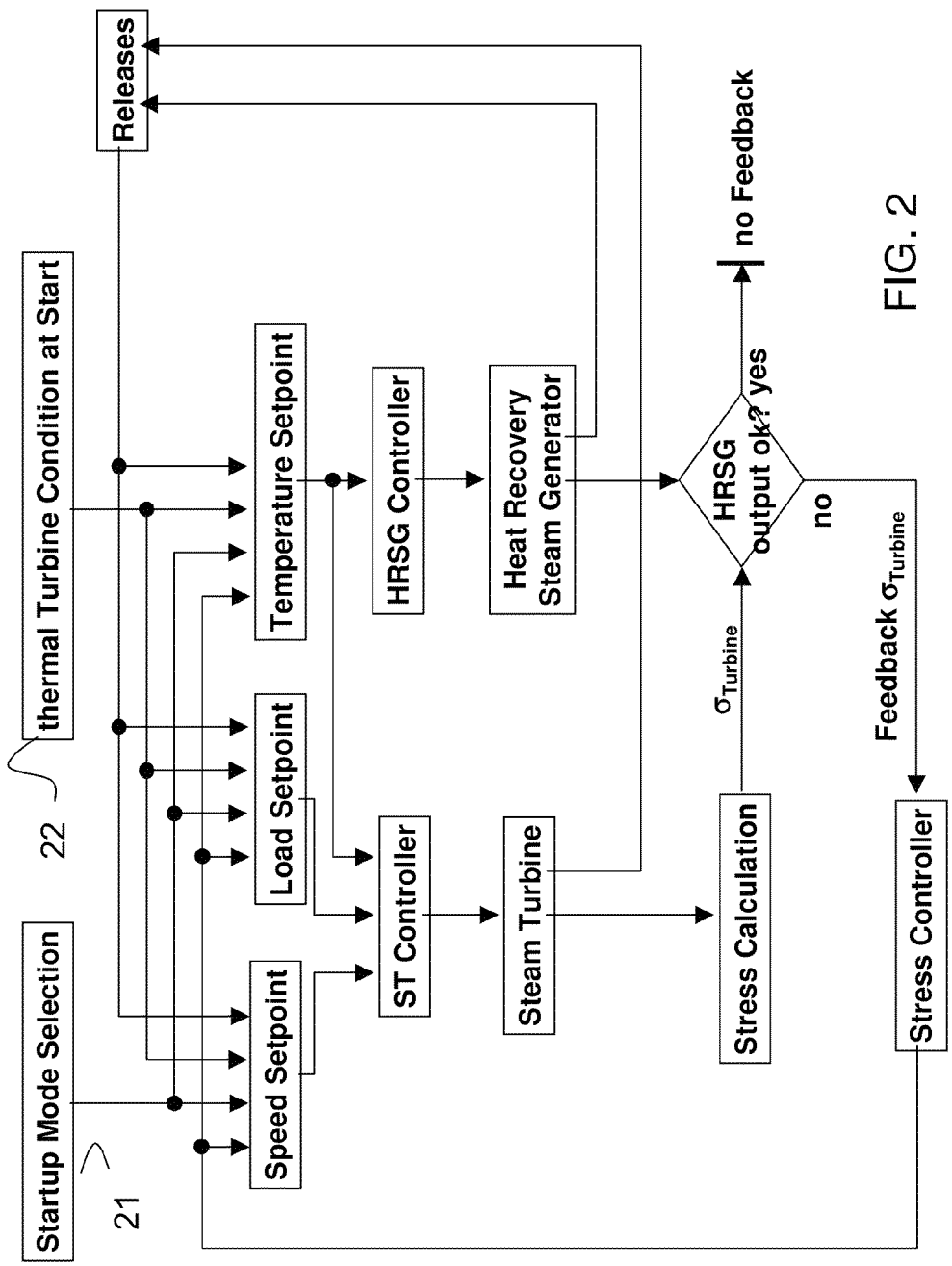
FIG. 2 is a block diagram illustrating connections between parameter in accordance with an example of the invention.

The control system 16 is used to perform operational steps which are described referring to FIG. 1, the block diagram of FIG. 2 and the examples illustrated in FIGS. 3A and 3B.

In accordance with the described example of the present invention, the startup procedure is chosen using at least two sets of conditions. The first set of condition is the Startup Mode Selection 21 and the second set is the Thermal Turbine Condition 22. The Startup Mode Selection 21 denotes conditions which are set by the power plant operator to fulfill external requirements typically based on economic considerations. In the current example the Startup Mode Selection 21 is a selection between a fast and a slow startup. The Thermal Turbine Condition 22 denotes a set of conditions which represent conditions imposed by the status of the turbine 12 at the planned beginning of a startup. These conditions are set to avoid mechanical failure or reduction of the lifetime of the turbine or any of its parts. In the current example the Thermal Turbine Condition 22 is based on temperature measurements and/or operating history and includes the determination of the thermal state of the turbine 12 at the planned beginning of a startup.

In the example the Startup Mode Selection 21 and the Thermal Turbine Condition 22 define a startup sequence of setpoints versus time. The startup sequence defines in principle the desired status of the turbine from its status at the initialization of the startup to the end of the startup. The beginning or initialization can be defined as related to the first steam admission into the turbine or as the first opening of the main control valve. The end of the startup can be defined as the point in time at which the turbine operates at nominal load.

A typical startup sequence is illustrated in FIG. 3A. It includes, for example, plots 31, 32, 33 which represent the setpoints during the startup period for the speed, the load and the steam temperature (in the example, upstream of the turbine), respectively. It should be clear to a person skilled in the art that the plots are merely for illustrative purposes only and can be represented within an implementation of this example in a variety of suitable ways such as tables or functions stored in memories associated or otherwise linked with the processing engine of the control system 16. The process is hence typically split into discreet time steps, the duration of which depends on the cycle rate of the controller or the rate at which a new measurement or control parameter can be generated and registered by the system 16. And in a typical control scheme setpoints are defined as tables or lists for each cycle of the controller, the duration which is typically less than a second. For the purpose of the below description of release points, the sequence of setpoints can be regarded as continuous or pseudo-continuous.

It should be further clear that the selection of speed, load and steam temperature is based on what is currently regarded as important parameters representing the turbine during startup. However, the process as described can make use of another set of sequences or additional setpoint sequences, if considered useful, representing other important process parameter such as for example steam pressure.

Among the startup sequences of speed, load and steam temperature the former two can be controlled by controlling the installation associated with the turbine 12, where as the latter requires control of the steam generator 13. In many of the known power plants, however, the degree of control the steam turbine control system 16 or ST Controller has over other control system as for example the boiler control system or HRSG Controller is very limited. Nonetheless both types of sequences can be part of the set of predefined startup sequences as is demonstrated by FIG. 3A. From a control point of view the differences is that the turbine control system 16 can control the former sequences, which in the present example include speed and load, directly via internal feedback control or other otherwise as is known in the art.

The second type of startup sequences, which in the present example includes the steam temperature or the steam pressure, is a sequence of set point which can only be requested and observed but not directly controlled by the steam turbine controller. In the example of FIG. 2, it is assumed that the steam temperature set point can be communicated as desired value to the HRSG Controller but not enforced by the separate steam turbine control system 16. In an integrated control system including both the steam turbine control system 16 or ST Controller and the boiler control system or HRSG Controller this distinction between sequences may disappear and be replaced by set point sequences which can all be controlled directly by the control system.

Also shown in FIG. 3A are a plurality of Release Points A, B, C, D, E ... X indicating times at which the started turbine and its environment are expected to have reached setpoints as defined by the selected startup sequence. In addition to the defined setpoints values a Release Point is further associated with an unconditional or conditional delay time or with a combination of unconditional and conditional delay times.

The number of release points during a startup sequence is in principle determined by an optimization aimed at ensuring that the turbine follows the selected startup sequence without causing damage. In an ideal system following the defined start-up sequence perfectly no release point is required, whereas in a very instable turbine environment release points could be set as densely along the time axis as the setpoints themselves. However the former is difficult to achieve while the latter case approaches a continuous feedback control system, which may not be able to deliver a defined start-up time. It was found that the number of release points is best set between 3 and 30, or between 2 and 20 or 3 and 15, or even between 3 and 10. In all these cases the number of release points is at least ten times smaller than the number of setpoints which define the startup sequence.

Using the discrete release points, it is possible to reduce possible intervention of the stress controller 19 on the startup process. During normal startup the stress controller 19 is configured to control the position of the main input valve 14 only when the determined stress leaves a very broad band of acceptable values. This can be seen as an absolute overriding control condition to prevent damage to the turbine parts. The other points in time at which the stress controller is configured to intervene and take direct control of the position of the main input valve 14 are limited in this example to the release points. A release point also has a wait period which has to pass before the stress controller control is enabled to control the position of the main input valve 14.

Thus a release point can be seen as a selected setpoint associated with a set of conditions which in turn define a test for the desired parameter values at this setpoint and a condition which directly or indirectly defines a waiting period, during which the progression along the selected startup sequences is interrupted.

The release point D of FIG. 3A, which is the release to begin loading of the turbine after synchronization, is for example defined as:

$$((t>=t(\text{synch})+t(\text{waitload}) \text{ AND } T(LS-SP)-\Delta T<T(LS)<T(LS-SP)+\Delta T \text{ AND } T(HRS-SP)-\Delta T<T(HRS)<T(HRS-SP)+\Delta T))$$

This test at the release point defines a test for the measured live steam temperature T(LS) and reheat steam temperature T(RHS) to be within a tolerance of ΔT equal to the desired temperature values T(LS-SP) and T(HRS-SP). The definition may include alternative condition related to stress values. A release is given and the startup continues as defined, if one of the conditions is true.

The Release Point E of FIG. 3A, which is closer to a simple temperature test point, is for example defined as:

$$(T(LS-RGRAD)-\Delta T<T(LS)<T(LS-RGRAD)+\Delta T \text{ AND } T(LS-SP)=T(LS-RGRAD)).$$

This test tests the measured live steam temperature T(LS) against the target value T(LS-RGRAD) when the live steam temperature set point T(LS-SP) has reached T(LS-RGRAD). Again the may include alternative condition related to stress values.

Setting a relatively broad band of acceptable values for the stresses and the initial delay time t(delay) contribute both to limiting the likelihood of a system state occurring where the stress controller 19 effectively controls the position of the main input valve 14. And as long as the stress controller 19 does not effectively take control of main input valve 14 in form of a feedback control, the control system 16 is configured to follow the startup sequence as initially selected though perhaps shifted in time for each delay accumulated during the previous sections of the startup sequence. Thus the system as a whole remains essential deterministic and not controlled by a constant feedback loop involving the stress controller. The control system 16 is then capable of predicting the startup time with a high degree of accuracy as the original startup time plus any actual delays accumulated at the Release Points already passed. This is in contrast to the estimate of the startup time as provided by known systems where those startup times are often only extrapolations from a current status during the startup process.

An example of such a delay is shown in FIG. 3B, which illustrates the startup sequences of FIG. 3A with an added delay Delay at Release Point D. The delay is caused as the real steam temperature of the steam as provided by the Steam Generator 13 is lower than according to the conditions set at Release Point D. The curve of the real steam temperature is shown as curved part of the line 33 during the delay interval.

The present invention has been described above purely by way of example, and modifications can be made within the scope of the invention. The invention also includes any individual features described or implicit herein or shown or implicit in the drawings or any combination of any such features or any generalization of any such features or combination, which extends to equivalents thereof. Thus, the breadth and scope of the present invention should not be limited by any of the above-described exemplary embodiments.

Each feature disclosed in the specification, including the drawings, may be replaced by alternative features serving the same, equivalent or similar purposes, unless expressly stated otherwise.

Unless explicitly stated herein, any discussion of the prior art throughout the specification is not an admission that such prior art is widely known or forms part of the common general knowledge in the field.

LIST OF REFERENCE SIGNS AND NUMERALS steam turbine power plant 10
steam generator 11
conduit 13
main inlet valve or valve system 14
outlet conduit 15
control system 16
sensors 17,18,19
Startup Mode Selection 21
Thermal Turbine Condition 22
plot of setpoints during the startup period for the speed 31
plot of setpoints during the startup period for the load, 32
plot of setpoints during the startup period for the steam temperature (inlet) 33
release points A,B,C,D,E ... X
delay at release point Delay

What is claimed is:

1. A method of controlling a startup of a steam turbine receiving steam from a steam generator and having a rotor linked to a power generator and a steam turbine controller controlling at least the position of a steam inlet valve located in a steam conduit between the steam generator and the steam turbine to control the mass flow into the steam turbine, the method comprising:

selecting, before beginning of the startup, a predefined set of startup sequences of setpoints based on a status of the steam turbine at the beginning of the startup and/or a startup mode chosen by the operator wherein the set of startup sequences of setpoints includes parameters not controlled by the steam turbine controller and parameters controlled by the steam turbine controller;

using the steam turbine controller to control the parameters controlled by the steam turbine controller so as to progress the steam turbine from setpoint to setpoint in accordance with the predefined set of startup sequences until reaching a release point, wherein each release point is associated with a respective setpoint and indicates a time at which the steam turbine is expected to reach the respective setpoint; and delaying, at the release point, moving to the next setpoint until actual/measured setpoint values agree with predefined setpoint values at the release point for the parameters not controlled by the steam turbine controller.

2. The method of claim 1, wherein the number of release points is at least 10 times smaller than the number of setpoints.

3. The method of claim 1, wherein the number of release points during the startup is less than 30.

4. The method of claim 1, wherein the predefined set of startup sequences of setpoints include sequences of values selected from one or more of sequences of values representing steam temperature, steam pressure, load on the rotor and rotor speed.

5. The method of claim 4, wherein the steam temperature and/or steam pressure are parameters not directly controlled by the steam turbine controller.

6. The method of claim 1, wherein a current startup time is generated by the system using a time difference between a current setpoint of the predefined set of startup sequences of setpoints to which the steam turbine progressed and the end of the predefined set of startup sequences of setpoints.

7. The method of claim 1, further using a stress controller to monitor stresses in the steam turbine and letting the steam turbine controller isolate the output of stress controller from changing the progressing of the steam turbine from setpoint to setpoint in accordance with the predefined set of startup sequences unless stresses are above a predefined critical value.

8. The method of claim 1, further comprising using a stress controller to monitor stresses in the steam turbine and between subsequent release points letting an output of stress controller change the progressing of the steam turbine from setpoint to setpoint in accordance with the predefined set of startup sequences only if the stresses are above a predefined critical value.

9. The method of claim 1, wherein the predefined set of startup sequences of setpoints based on a status of the steam turbine are stored in numerical form in a memory linked with the steam turbine controller or calculated using the status of the steam turbine at a beginning of the startup and/or the startup mode as input to generate the predefined set of startup sequences of setpoints in accordance with defined rules.

* * * * *